Patented Sept. 27, 1949

2,482,748

UNITED STATES PATENT OFFICE 2,482,748

4,4'-ISOPROPYLIDENE BIS-(2-ISOPROPYL-PHENOL)

Andrew J. Dietzler, Midland, Mich., assignor to The Dow Chemical Company, Midland, Mich., a corporation of Delaware No Drawing. Application May 28, 1948, Serial No. 29,940

1 Claim. (Cl. 260—619)

1

This invention is directed to the new chemical compound, 4,4'-isopropylidene bis-(2-isopropylphenol) having the formula

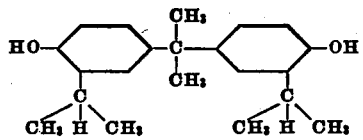

This compound is a white crystalline solid melting at 96.5°–97° C. It is soluble in many common organic solvents, insoluble in water, stable in the presence of dilute acids, and soluble in aqueous alkali. The compound has been found valuable in the preparation of more complex organic derivatives, as a constituent of veterinary medicines, as a fungistat, and in the preparation of phenol-formaldehyde resins.

4,4'-isopropylidene bis-(2-isopropylphenol) is prepared according to the general method described in United States Patent No. 2,359,242. According to this procedure, acetone is reacted with a molecular excess of 2-isopropylphenol in the presence of an acid-acting condensing agent and a sulfur-containing catalyst. In practice, 4 moles or more of the phenol is employed per mole of acetone, in the presence of about 0.3 mole of hydrogen sulfide as catalyst and 0.3 to 0.5 mole of anhydrous hydrogen chloride as condensing agent. The acetone and phenol are mixed together, and gaseous hydrogen sulfide bubbled into the acetone solution of the phenol at such a rate as to be substantially completely absorbed and at a temperature below the boiling temperature of the acetone and preferably below 40° C. The condensation is thereafter accomplished by slowly introducing the anhydrous hydrogen chloride into the reaction mixture with stirring, the temperature being maintained at below 40° C. The condensation begins immediately upon the introduction of the hydrogen chloride with the production of the desired bis-phenol compound and water of reaction. The rate of condensation is slow and the reaction is not strongly exothermic. While a substantial degree of reaction is obtained in few hours, best yields have been obtained by permitting the reaction mixture to stand for several days at room temperature before attempting separation of the desired bis-phenol product. This separation is accomplished in conventional fashion by dissolving the reaction mixture in

2 water immiscible organic solvent; repeated washing of the solvent solution with water; fractionally distilling under reduced pressure to recover solvent, water and excess 2-isopropylphenol; and steaming the residue to remove the last traces of unreacted 2-isopropylphenol. The residue from this series of operations may be recrystallized to obtain the desired bis-phenol compound in substantially pure form.

In a representative preparation, 29 grams (0.5 mole) of acetone and 340.5 grams (2.5 moles) of 2-isopropylphenol were mixed together in a glass reactor equipped with agitator and inlet tubes for the introduction of gaseous reactants. 6.5 grams (0.19 mole) of gaseous hydrogen sulfide was bubbled into and below the surface of the reaction mixture and with agitation over a period of 5 minutes. The temperature of the mixture during this addition was 20° C. Agitation was continued and 10 grams (0.273 mole) of anhydrous hydrogen chloride introduced below the surface of the mixture over a period of 24 minutes. During this addition, the temperature gradually rose from 20° C. to 30° C. The resulting crude reaction product was allowed to stand for 72 hours at room temperature, and then diluted with 200 milliliters of benzene, washed five times with 100 milliliter portions of water, and fractionally distilled under reduced pressure at temperatures gradually increasing to a pot temperature of 160° C. at 10 millimeters pressure. The residue was blown at 10 millimeters pressure with 40 grams of steam at 150°–160° C., removed from the reactor, and dried. 150.5 grams of a 4,4'-isopropylidene bis-(2-isopropylphenol) product was thereby obtained as a light yellow solid freezing at 89.5° C. This was a yield of 96.2% of theoretical based on the acetone employed.

A portion of the crude product was recrystallized from petroleum ether (boiling range 77°–115° C.) to obtain pure 4,4'-isopropylidene bis-(2-isoprophylphenol) melting at 96.5°–97° C. and having an apparent molecular weight of 315.7 as compared to 312.4 theoretical.

I claim:
4,4'-isopropylidene bis-(2-isopropylphenol), a white crystalline compound melting at 96.5°–97° C.

ANDREW J. DIETZLER.

No references cited.